United States Patent [19]

Gorgerat

[11] 4,100,804
[45] Jul. 18, 1978

[54] BIMETALLIC TEMPERATURE MEASURING DEVICE

[75] Inventor: Jean Pierre Gorgerat, Echandens, Switzerland

[73] Assignee: Rueger S.A., Crissier, Switzerland

[21] Appl. No.: 706,892

[22] Filed: Jul. 19, 1976

[51] Int. Cl.² ............................................. G01K 5/64
[52] U.S. Cl. .................................................. 73/363.9
[58] Field of Search ............................ 73/363.9, 363.7

[56] References Cited

U.S. PATENT DOCUMENTS

| 442,879 | 12/1890 | Haight | 73/363.7 X |
| 2,008,758 | 7/1935 | Hildebrecht | 63/363.9 X |
| 2,437,961 | 3/1948 | Jensen | 73/363.9 X |
| 2,523,514 | 9/1950 | Paine | 73/363.9 X |
| 2,609,690 | 9/1952 | Osborne et al. | 73/363.9 X |
| 3,394,591 | 7/1968 | Raynes | 73/363.9 X |

*Primary Examiner*—Anthony V. Ciarlante
*Attorney, Agent, or Firm*—Henry M. Bissell

[57] ABSTRACT

A helical bimetal strip disposed in a probe tube is connected at one end to a fixed support and at its other end to an arbor of an indicating member. The arbor passes through the helical strip into pivotal contact with a bearing carried by the support and against which the arbor is applied under pressure.

2 Claims, 1 Drawing Figure

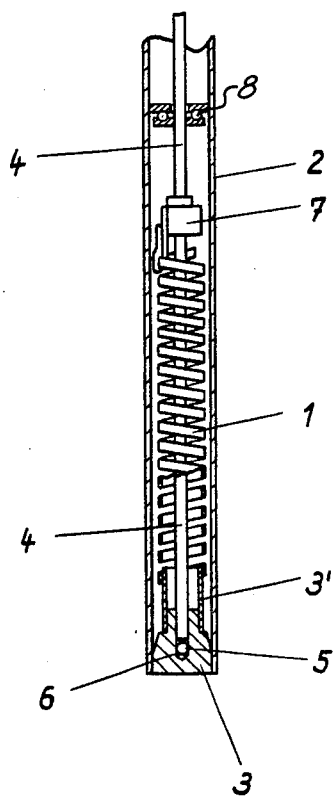

BIMETALLIC TEMPERATURE MEASURING DEVICE

The invention relates to temperature measuring devices of the type comprising a helically-wound bimetal strip disposed in a probe tube, one end of the helical strip being connected to a support in the probe tube and the other end to an arbor carrying an indicator.

Such devices are sometimes incorporated in apparatus subject to strong continuous vibrations, for instance thermometers arranged to measure the exhaust-gas temperature of Diesel engines. In this instance, the stresses to which the instrument is submitted, due to the frequency and amplitude of vibrations of the engine, and its accelerations and decelerations, may be such that at a given moment the helical bimetal strip vibrates at its resonant frequency and is abruptly broken.

An object of the invention is to remedy this disadvantage.

The invention therefore proposes an improvement in such a device in which the support of the probe tube has abutment means for pivotally receiving an end of the arbor, the arbor extending through the entire length of the helical bimetal strip into pivoting contact with the abutment means of the support, and securing means are arranged to fix said other end of the helical bimetal strip to the arbor at a given location such that a predetermined pressure is exerted by the arbor against the abutment means.

The single FIGURE of the accompanying drawing is a cross-section showing, by way of example, an embodiment of the invention.

The illustrated, partially-shown temperature measuring device comprises a bimetal strip wound to form a helix 1 and disposed in a probe tube 2. One end of helix 1 is connected, by the intermediate of a sleeve 3', to a support plug 3 of the tube 2 and its other end is connected to an arbor 4 forming part of a movable indicating member, the arbor 4 for example directly carrying a pointer, not shown.

Abutment means, formed by a ball 5, are disposed in a blind hole 6 in plug 3. Arbor 4 passes through the entire length of the bimetallic helix 1 and its lower end contacts ball 5. The other end of helix 1 is fixed to the arbor 4 in known manner by a collar 7, at a location such that a pressure is exerted by the arbor 4 against ball 5. This pressure is such that it does not impede pivoting of the arbor 4 and hence influence the temperature indication of the instrument, but is sufficient to prevent vibrations and any damage resulting therefrom.

Instead of having a single helical bimetal strip, the described instrument could have several helical bimetal strips disposed concentrically to one another.

In an optional arrangement shown near the top of the FIGURE, a part of the arbor 4 beyond collar 7 could be mounted in a ball bearing 8 fixed in tube 2. Such an arrangement would enable the arbor 4 to be maintained, without preventing it from pivoting, even if the bimetallic helix has undergone a transformation during use, in particular if it has suffered a loss of elasticity after having been submitted to very high temperatures. Such a ball bearing thus forms an auxiliary means for maintaining the pressure of the arbor 4 against ball 5.

Instead of a ball 5, other bearing members such as a jewel could be used.

What is claimed is:

1. A bimetallic temperature measuring device comprising:
    a probe tube having a terminal end;
    a rotary arbor mounted in the probe tube for attachment to an indicating member remote from the terminal end;
    a support mounted in the probe tube adjacent the terminal end;
    a helically-wound bimetal strip disposed in the probe tube and having first and second opposite ends, the first end being connected to the support;
    the support being configured to provide abutment means for rotatably supporting an end of the arbor adjacent the terminal end of the probe tube;
    collar means connected to the second end of the strip and attachable to the arbor at such a predetermined position remote from the terminal end of the probe tube relative to the strip for maintaining the strip under sufficient tension and for developing a predetermined force urging the arbor against the abutment means, thereby to prevent vibration of the strip at the resonant frequency thereof;
    and auxiliary means for maintaining the pressure of said arbor against said abutment means.

2. A device according to claim 1, in which said auxiliary means comprise a ball bearing fixed to the probe tube and to the arbor.